(12) United States Patent
Chen et al.

(10) Patent No.: US 12,732,691 B2
(45) Date of Patent: Sep. 8, 2026

(54) PHOTOGRAPHING METHODS AND DEVICES

(71) Applicant: SHANGHAI ZHANGMEN SCIENCE AND TECHNOLOGY CO., LTD., Shanghai (CN)

(72) Inventors: Danian Chen, Shanghai (CN); Xiaobin Gu, Shanghai (CN); Wenzhao Liang, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/344,961

(22) Filed: Jun. 11, 2021

(65) Prior Publication Data

US 2021/0306559 A1 Sep. 30, 2021

Related U.S. Application Data

(63) Continuation of application No. PCT/CN2019/123500, filed on Dec. 6, 2019.

(30) Foreign Application Priority Data

Dec. 11, 2018 (CN) ........................ 201811513708.1

(51) Int. Cl.
*H04N 5/232* (2006.01)
*H04N 1/00* (2006.01)

(52) U.S. Cl.
CPC ..... *H04N 5/23222* (2013.01); *H04N 1/00209* (2013.01); *H04N 1/00244* (2013.01); *H04N 5/23225* (2013.01); *H04N 5/232939* (2018.08); *H04N 2201/0084* (2013.01)

(58) Field of Classification Search
CPC ........... H04N 1/00209; H04N 1/00244; H04N 5/23222; H04N 5/23225; H04N 5/232939; H04N 2201/0084; G06V 10/70; G06V 10/72
See application file for complete search history.

(56) References Cited

U.S. PATENT DOCUMENTS 5,831,670 A 11/1998 Suzuki
10,878,550 B2 * 12/2020 Shen ..................... G06T 7/0002
2016/0142626 A1 * 5/2016 Bostick .................. G06Q 50/01 348/207.11
2019/0174056 A1 * 6/2019 Jung .................. H04N 5/23218
2020/0184215 A1 * 6/2020 Xu ......................... G06V 20/10

FOREIGN PATENT DOCUMENTS

CN 104301613 A 1/2015
CN 105144696 A 12/2015
CN 106210513 A 12/2016
(Continued)

*Primary Examiner* — Daniel M Pasiewicz
(74) *Attorney, Agent, or Firm* — Finnegan, Henderson, Farabow, Garrett & Dunner, LLP

(57) ABSTRACT

The present application provides a photographing method and device. The solution acquires a first image through a camera module, then acquires a second image conforming with a composition mode, according to the first image, and in turn determines photographing parameters suitable for the second image, and photographs the second image based on the photographing parameters.

15 Claims, 2 Drawing Sheets

(56) References Cited

FOREIGN PATENT DOCUMENTS

| | | | |
|---|---|---|---|
| CN | 106357804 | A | 1/2017 |
| CN | 107317962 | A | 11/2017 |
| CN | 107566529 | A | 1/2018 |
| CN | 108833784 | A | 11/2018 |
| CN | 109495686 | A | 3/2019 |

* cited by examiner

PHOTOGRAPHING METHODS AND DEVICES

CROSS REFERENCE TO THE RELATED APPLICATION

This application is the continuation application of International Application No. PCT/CN2019/123500, filed on Dec. 6, 2019, which is based upon and claims priority to Chinese Patent Application No. 201811513708.1, filed on Dec. 11, 2018, the entire contents of which are incorporated herein by reference.

FIELD

The present application relates to a field of information technology, and more particularly relates to a photographing method and device.

BACKGROUND

With the popularity of various terminal devices with photographing functions, people use these terminal devices to take photos in various scenarios in their daily lives. However, since most of the users do not have professional photography skills, it is usually difficult for them to get satisfying results of photographing. At present, there are some technologies on the market assisting ordinary users with photographing. However, scenarios to which these technologies are applicable are usually very simple, and some assistance functions can be provided only in a single scenario such as a portrait photographing mode, which can only automatically assist users to adjust part of parameters when the users photograph portraits. Therefore, needs from users in a variety of photographing scenarios may not be satisfied.

SUMMARY

One of the objectives of the present application is to provide a method and device for binding a camera device.

To achieve the above objective, some embodiments of the present application provide a photographing method. The method includes:

acquiring a first image through a camera module;

acquiring a second image conforming with a composition mode, according to the first image; and determining photographing parameters suitable for the second image, and photographing the second image based on the photographing parameters.

In some embodiments of the present application, it is also provided a photographing device. The device includes a memory for storing computer program instructions and a processor for executing computer program instructions, and the computer program instructions, when executed by the processor, trigger the device to perform the photographing method.

In addition, in some embodiments of the present application, it is also provided a computer-readable medium having computer program instructions stored thereon. The computer-readable instructions are executable by a processor to implement the photographing method.

A solution provided in some embodiments of the present application acquires a first image through a camera module; then acquires a second image conforming with a composition mode, according to the first image; and in turn determines photographing parameters suitable for the second image, and photographs the second image based on the photographing parameters. Thus, in various scenarios, the detailed content of the first image may be taken as a processing basis, and to enable the user to acquire the second image conforming with the composition mode, and to automatically determine suitable photographing parameters for the user to photograph. Therefore, needs from users in a variety of photographing scenarios can be satisfied.

DESCRIPTIONS OF THE DRAWINGS

Embodiments of the present application will become more apparent by reading the detailed description of non-limiting embodiments with reference to the following drawings.

The identical or similar reference numerals in the drawings represent the identical or similar components.

DETAILED EMBODIMENTS

Figure 1:
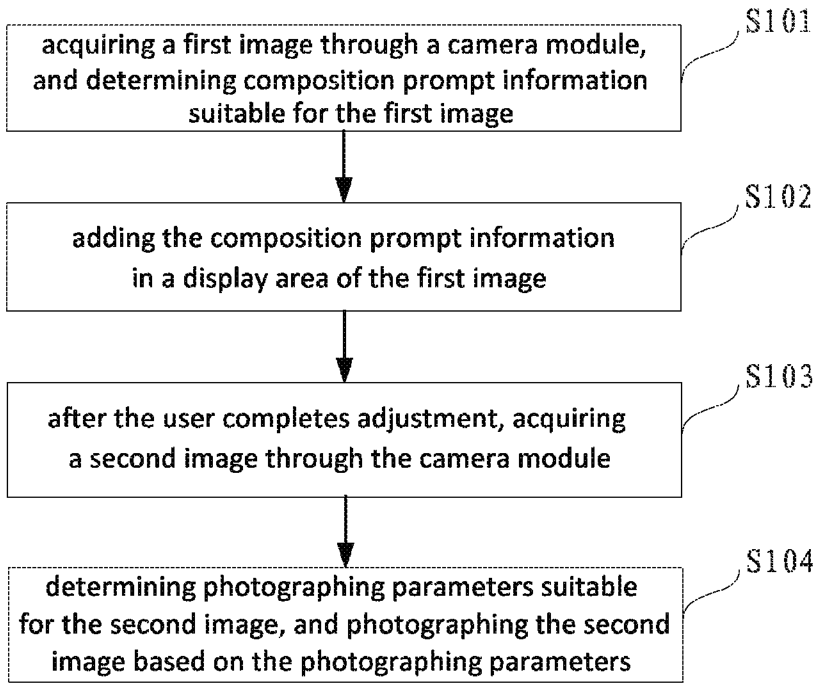
FIG. 1 is a processing flowchart of a photographing method provided by an embodiment of the present application.

The embodiments of the present application will be described clearly and fully with reference to the accompanying drawings in the embodiments of the present application below. The described embodiments are parts of the embodiments, but not all of the embodiments of the present application.

In a typical configuration of the present application, a terminal and a device of a service network both includes one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium includes permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission medium, which can be used to store information that can be accessed by a computing device.

An embodiment of the present application provides a photographing method. In this solution, the detailed content of the first image acquired by the camera module may be taken as a processing basis in various scenarios, and to enable the user to acquire the second image conforming with the composition mode, and then to automatically determine suitable photographing parameters for the user to photograph. Therefore, needs from users in a variety of photographing scenarios can be satisfied.

In practical scenarios, the executing entity of the method may include but is not limited to various user equipments with various photographing functions such as cameras, mobile phones, tablets, digicams, etc. In addition, the user equipments may also be network connection-enabled devices. After a user equipment is connected with a server device, parts of computational processing will be handed over to the server device to be performed, and to improve accuracy and efficiency of processing with utilization of computing capability at the server device, and meanwhile to reduce processing load at the user equipment, thus lowering requirements for processing capability at the user equipment. Here, the server device may be implemented as but is not limited to: a network host, a single network server, a set of multiple network servers, or a set of Cloud Computing-based computers. Here, the cloud is composed of a massive number of hosts or network servers based on Cloud Computing, and cloud computing is a distributed computing, which may be a virtual computer composed of a group of loosely coupled computer sets.

An embodiment of the present application provides a photographing method. A first image through a camera module is acquired at first. After the first image is acquired, a second image conforming with a composition mode is acquired according to the first image. Then photographing parameters suitable for the second image are determined, and the second image is photographed based on the photographing parameters.

The camera module includes at least a component such as a lens, an optical sensor and corresponding circuits, and is used to acquire an image of a view to complete photographing. The first image is the current framing content of the camera module. For example, all cameras of devices such as mobile phones, tablets belong to the camera module. When a user uses his/her mobile phone to take a photograph, he/she will open a photographing application (app) to start a camera, and then points the camera to the view to be photographed. At this time, the mobile phone is enabled to acquire the first image of the view through the camera.

The second image refers to an image conforming with a composition mode, which is acquired by adjustment on the basis of the first image. For example, the camera module may be adjusted to change the current framing content, i.e., changed from the first image to the second image. Such an adjustment needs to be realized by the user adjusting the camera module, and thus the user may be informed of how to make the adjustment by means of providing prompt information. In one embodiment, the first image may also be processed on the basis of the first image, such as some part of the contents may be intercepted or parts of the image contents may be transformed, etc. Such an adjustment may be realized through processing of the first image by a processing module of the user equipment.

FIG. 1 shows a processing flow for a photographing method provided by an embodiment of the present application. This embodiment adopts the foregoing first way of acquiring a second image, and includes the following processing steps.

At step S101, a first image is acquired through a camera module, and composition prompt information suitable for the first image is determined. The composition prompt information may be various information for prompting a user how to compose an image, for example, various auxiliary lines or some text prompt information.

At step S102, the composition prompt information is added in a display area of the first image, so that the user adjusts the camera module according to the composition prompt information. The display area of the first image may be an area of a user equipment which executes the photographing method, for displaying the first image acquired by the camera module. For example, when the user uses a mobile phone to take a photograph, views acquired by a camera will be displayed in the display area of the photographing app in real-time, so that the user can view the current framing content. By adding the composition prompting information in the display area of the first image, the user may be clearly prompted how to adjust the current framing content, and to achieve a better photographing effect.

Figure 2:
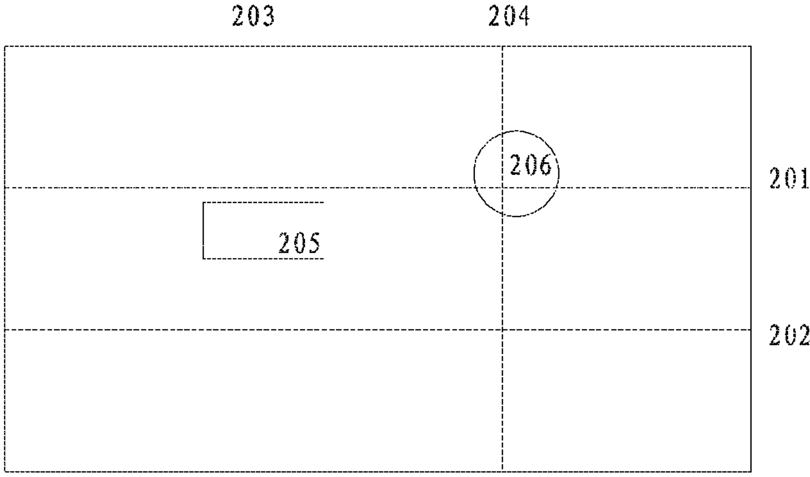
FIG. 2 is a schematic diagram of a display effect for composition prompt information in an embodiment of the present application.

For example, the composition prompt information may be two horizontal auxiliary lines and two vertical auxiliary lines, which divides the display area into 9 equal parts to provide the user with a way of how to compose the image in the form of nine square grids, as shown in FIG. 2, in which reference numerals 201 to 204 are auxiliary lines, and reference numerals 205 and 206 are views in the frame. After the composition prompt information is displayed in the display area, the user may adjust the camera module according to the composition prompt information to change the framing content. For example, some certain views may be placed at positions where the auxiliary lines are located, etc., and to achieve a better photographing effect. In addition, text prompt information may also be added on this basis, such as effects resulting from the foregoing two horizontal auxiliary lines and two vertical auxiliary lines added in the display area, so that photographing beginners are also able to use various auxiliary lines for composition prompt for composition creation.

At step S103, after the user completes the adjustment, the second image is acquired through the camera module. During the adjustment by the user, the framing content of the camera module will be changing continuously. After the user completes the adjustment according to the composition prompt information, the framing content of the camera module will change from the initial first image to the second image. The second image is the image to be photographed by the user after the he/she completes the composition.

At step S104, photographing parameters suitable for the second image are determined, and the second image is photographed based on the photographing parameters. The photographing parameters refer to related parameters which can affect the photographing effect, such as parameters of a shutter, a aperture, etc. According to view content contained in the second image, automatically determining the photographing parameters suitable for the second image enables the final photographed image to have a better photographing effect. Thus, in various scenarios, suitable composition prompt information can be provided to the user according to the detailed content of the first image acquired through the camera module, and to prompt the user how to adjust. Meanwhile, after the user completes the adjustment, suitable photographing parameters are automatically determined for the user. Therefore, needs from users in a variety of photographing scenarios are satisfied.

In some embodiments of the present application, when the composition prompt information suitable for the first image is determined, scenario information and composition mode may be determined according to the first image at first. The scenario information refers to a current photographing scenario represented by the view and the environment in the first image. For example, when most of the content in the first image is a close-up of a person, current scenario information may be considered as a portrait scenario. In addition, the scenario information may also be a night scenario, scenery, etc. The composition mode refers to a mode for arranging positions of views in the image when taking a photograph. For example, commonly used composition modes include nine square grids, golden section, etc. Here, the scenario information and composition mode listed in this embodiment are merely an example, and that other existing scenario information and composition mode or those that may appear in the future fall within the protection scope of the present disclosure and are incorporated herein by reference, if applicable to the present disclosure.

When the scenario information and the composition mode are determined according the first image, a sufficient number of sample images may be collected in advance based on a deep learning method. These sample images have been labeled with scenario information and composition modes. Then a recognition model is trained based on these sample images. As such, the recognition model may be used to recognize the scenario information and the composition mode corresponding to the first image. Therefore, when the scenario information and the composition mode are determined according to the first image, the scenario information and the composition mode may be determined according to the first image and the recognition model. The recognition model is generated by training sample images which have been labeled with scenario information and composition modes. For recognition of scenario information and composition modes, one recognition model may be adopted to simultaneously recognize scenario information and a composition mode of an image. In one embodiment, two recognition models may be adopted to recognize scenario information and composition modes separately. At this time, the recognition models need to be trained with their own sets of sample images.

In a practical scenario, training of the model and recognition may be completed at a user equipment or a server device. In one embodiment, the training of the model is completed at the server device, and the recognition is completed at the user equipment, as long as the user equipment updates the recognition model with the latest recognition model from the server device according to a predetermined strategy.

For example, in another embodiment of the present application, when scenario information and a composition mode are determined according to the first image, the user equipment may transmit the first image to the server device, so that the server device determines the scenario information and the composition mode of the first image according to the first image and the recognition model, and transmits the determined scenario information and composition mode to the user equipment. The user equipment receives the scenario information and the composition mode of the first image transmitted by the server device, and thus acquires information required for subsequent processing. By deploying part of the processing to the server device, accuracy and efficiency of the processing may be improved with utilization of the computing capability of the server device, and meanwhile processing load at the user equipment is reduced and requirements on the processing capability of the user equipment are lowered.

In this embodiment, data interaction between the user equipment and the server device may be implemented by various networks, such as WIFI network, mobile data network, Bluetooth network, etc. In order to achieve a better display effect, an image format with higher resolution is generally adopted for the first image. Therefore, when the user equipment transmits the first image to the server device through the network, relatively larger bandwidth resources are often necessarily occupied, especially when a mobile data network is used, a large amount of data will also be consumed. To solve this problem, the present application provides another embodiment. In this embodiment, before the first image is transmitted to the server device, the user equipment may compress the first image at first, and then transmits the compressed first image to the server device, so that the server device determines the scenario information and the composition mode of the first image according to the compressed first image and the recognition model. Since the compressed first image can still express the views contained in the image, and will not substantially affect a recognition result, compressing the image before transmission may reduce bandwidth occupation and reduce data consumption.

After the scenario information and the composition mode are determined, the composition prompt information suitable for the first image may be determined according to the scenario information and the composition mode. For example, when the scenario information is determined as a night scenario and the composition mode is determined as a mode of nine square grids, the composition prompt information may be determined as auxiliary lines at specific locations and corresponding text prompts, so that the user may adjust specific views to be located at specific locations in the frame. For example, a street lamp in the frame may be adjusted to be aligned with one of the auxiliary lines, so that the street lamp is located at one third of width of the frame.

When the user is making the adjustment based on the composition prompt information in the display area, the camera module is still framing views in real-time. Therefore, in some embodiments of the present application, the photographing method further includes: acquiring real-time images through the camera module during the adjustment by the user, and determining and displaying scores of the real-time images to the user to assist the user in completing the adjustment. The real-time images are a series of images including the first image and the second image changed from the first image acquired by the camera module during the adjustment. When a score of a real-time image is high, the photographing effect of the real-time image may be considered good. Thus, the user may use the scores to assist with the adjustment.

For example, when a user is taking a photo with a mobile phone, the composition prompt information which is determined based on the first image has been displayed on the screen, as shown in FIG. 2. Based thereon, the user will adjust a camera of the mobile phone according to the auxiliary lines 201 to 204 in FIG. 2 to change the framing content, and the framing content which is continuously changing is the real-time image. In a practical scenario, in order to reduce processing load, not all of the real-time images are processed, instead a few frames from the real-time images may be selected for processing. A selection rule may be preset. For example, the current real-time image may be scored based on a user's input (i.e., when the user clicks or inputs a specific gesture). In one embodiment, the current real-time image may be scored based on a state of an equipment used by a user (e.g., when determining that a movement range of the mobile phone is less than a preset value or that the mobile phone is static according to Gyro information of the mobile phone). In another embodiment, the current real-time image may be scored based on a preset time interval, (e.g., every one second).

The score of the real-time image may be displayed in a display area of the real-time image, so that the user may quickly learn the score of the current real-time image, and to determine whether further adjustment is required. For example, the score of the real-time image is displayed on one of the corners of the display area.

When the score of the real-time image is determined, deep learning methods may also be adopted. That is, a sufficient number of sample images are collected in advance. These sample images have been manually labeled with scores, and then are trained to generate a score regression model. The score regression model may be used to recognize the score of the real-time image. That is, the score of a real-time image may be acquired by inputting the real-time image. Therefore, when the score of the real-time image is determined, the score of the real-time image may be calculated according to the real-time image and the score regression model. The score regression model is generated by training sample images which have been labeled scores.

Similarly, training of the score regression model and scoring may be completed at a user equipment or a server device. In one embodiment, the training of the model is completed at the server device, and the scoring is completed at the user equipment, as long as the user equipment updates the score regression model with the latest score regression model from the server device according to a predetermined strategy. For example, the server device may train image samples which were collected in advance, to generate a score regression model. When the real-time images need to be scored by the user equipment, the user equipment may transmit the real-time images to the server device, so that the server device may calculate the scores of the real-time images according to the real-time images and the score regression model, and return the scores to the user equipment. The user equipment receives the scores of the real-time images transmitted by the server device, and thus determines the scores of the real-time images and displays them in the display area.

When the real-time images are transmitted to the server device, the user equipment may adopt a similar method as for transmitting the first image. That is, the user equipment compresses the real-time images and transmits the compressed real-time images to the server device, so that the server device calculates the scores of the real-time images according to the compressed real-time images and the score regression model, and to reduce bandwidth occupation and reduce data consumption.

In addition, in order to score the real-time images more accurately, the score regression model may be trained in a more refined way. For example, sample images related to each preset area are trained to generate a score regression model corresponding to the preset area. The preset area is an area divided based on geographic location, e.g., various scenic spots, etc. The sample images related to the preset area may be photos taken in the preset area. Because views of each scenic spot are different from each other, scoring standards will also be different. Therefore, the score regression model generated by training the sample images of each scenic spot can score the images of the scenic spot more accurately. Based thereon, in the method provided by the embodiments of the present application, a preset area to which a real-time image belongs may also be determined according to positioning information acquired when the real-time image is acquired. Thus, when calculating the score of the real-time image according to the real-time image and the score regression model, the score of the real-time image may be calculated according to the real-time image and the score regression model corresponding to the preset area, which improves the accuracy of the scoring and provides users with more accurate reference information.

In some embodiments of the present application, when a user completes the adjustment and acquires the second image through the camera module, whether the user has completed the adjustment may be determined at first. The determination method may be specifically completed by a gyroscope built-in the user equipment. For example, gyroscope information is obtained. If the gyroscope information indicates that the user equipment has not moved within a preset period of time or that a movement range of the user equipment is lower than a preset value, it is determined that the adjustment has been completed. As such, whether the user has completed the adjustment is determined according to the gyroscope information. After it is determined that the adjustment has been completed, autofocus is performed, and the focused second image is acquired through the camera module. Therefore, in this embodiment, the second image is the framing content acquired by the camera module after the autofocus is completed.

When photographing parameters suitable for the second image is determined, a focus area of the second image may be recognized first and brightness of the focus area and brightness of a global area of the second image may be determined. Then, the photographing parameters suitable for the second image may be determined according to the brightness of the focus area and the brightness of the global area of the second image.

When determining the photographing parameters suitable for the second image according to the brightness of the focus area and the brightness of the global area of the second image, a deep learning method may be adopted, and sample images which have been labeled with photographing parameters may be collected in advance, focus areas of the sample images are recognized and determined, the brightness of the focus areas and the brightness of the global areas are collected, and then the sample images for which brightness of focus areas, brightness of global areas and photographing parameters have been determined are trained to generate a parameter statistical model. After the parameter statistical model is obtained, the parameter statistical model may be adopted to acquire the photographing parameters suitable for the second image by inputting the brightness of the focus area and the brightness of the global area of the second image.

In a practical scenario, the training of the parameter statistical model and the determination of the photographing parameters may be completed at the user equipment or at the server device. In one embodiment, the training of the model is completed at the server device, and the determination of the photographing parameters is completed at the user equipment, as long as the user equipment updates the parameter statistical model with the latest parameter statistical model from the server device according to a predetermined strategy.

In this scenario, the server device obtains sample images in advance which have been labeled with photographing parameters, recognizes and determines focus areas of the sample images, then makes statistics on brightness of the focus areas, brightness of the global areas, and then trains the sample images which have been labeled with the brightness of the focus areas, the brightness of the global areas and the photographing parameters to generate a parameter statistical model. When the photographing parameters suitable for the second image are required to be determined, the user equipment may first recognize the focus area of the second image, determine the brightness of the focus area and the brightness of the global area, and then transmit the brightness of the focus area and the brightness of the global area of the second image to the server device, so that the server device determines the photographing parameters suitable for the second image based on the parameter statistical model generated by training and returns the photographing parameters to the user equipment.

In another embodiment of the present application, before determining composition prompt information suitable for the first image currently acquired through a camera module according to the first image, positioning information may be acquired at first, and whether the first image belongs to a preset area is determined according to the positioning information. When the first image belongs to the preset area, recommended images belonging to the preset area are displayed to a user. For example, the preset area may be various scenic spots set in advance. When the positioning information indicates a certain scenic spot, the user may be considered as currently taking a photo in the scenic spot. The recommended images belonging to the preset area may be photos related to the scenic spot, which may be used to provide the user with reference for taking photos.

In a practical scenario, the positioning and the recommendation may be completed at the server device. The user equipment may transmit location information to the server device, and obtain recommended images belonging to the preset area from the server device, and display the recommended images to the user. The server device may collect images belonging to each preset area in advance, to provide to the user as recommended images.

The embodiment of the present application also provides a photographing assistance system which adopts the foregoing photographing method. The system includes two parts, a server and a client. The server is the foregoing server device, and the client is the foregoing user equipment. In the embodiment of the present application, the server is used to implement the following functions:

1) The server is used to collect and store high-quality photographed samples as image samples for model training. These image samples may contain information such as image data, photographing parameters, GPS information, device model, and photographing time.

2) Secondary attributes of the image samples comprising scenario information, scores, composition modes, etc. are manually labeled.

3) Focus areas of sample images may be recognized through existing deep learning models, and statistics is made on brightness of focus areas and brightness of global areas of the sample images.

4) A parameter statistical model for providing photographing parameters is trained and generated through existing deep learning models. The parameter statistical model may be stored at the server, and is used to determine photographing parameters based on brightness related information uploaded by the client.

5) A recognition model for recognizing scenario information is trained and generated through existing deep learning models. The recognition model is transmitted to the client, and is used to recognize the scenario information at the client.

6) A score regression model is trained and generated through existing deep learning models. The score regression model is stored at the server, and is used to score images uploaded by the client.

7) For different scenic spots, whether images belong to a scenic spot is determined according to GPS information of image samples. Additionally a score regression model corresponding to each scenic spot is trained and generated with image samples of each scenic spot.

8) A composition mode recognition model is trained and generated through existing deep learning models. The recognition model is transmitted to the client, and is used to recognize composition modes at the client.

The client is used to implement the following functions:

1) Scenic Spot Mode:

a) After a photographing function is started, current GPS information is obtained and reported to the server. The server determines the scenic spot to which the current location belongs based on the GPS information, and recommends, to the client, excellent works (i.e., recommends images) of the scenic spot.

b) The user may frame views by himself/herself with reference to the recommended works, and thus acquire an image through a camera module at the client. The client locally recognizes recognition scenario and composition model of the image through the recognition model, and then provides composition prompt information such as auxiliary lines etc.

c) The user adjusts the framing content according to auxiliary lines, during which real-time images are generated. The client periodically uploads compressed real-time images to the server, so that the server scores them based on a score regression model, and then returns the scores to the client to be displayed on a screen of the client for user's reference.

d) The client reads information from the built-in gyroscope. When a user stops moving, it is determined that adjustment is completed and autofocus will be performed.

e) After autofocus stops, photographing parameters are determined according to a parameter statistic model of the server, and the brightness of current focus area and the global area, and to automatically set a shutter and an aperture.

f) Finish photographing.

2) Non-Scenic Spot Mode:

a) The user may frame views by himself/herself, and thus acquire an image through a camera module at the client. The client locally recognizes recognition scenario and composition model of the image through the recognition model, and then provides composition prompt information such as auxiliary lines etc.

b) The user adjusts the framing content according to auxiliary lines, during which real-time images are generated. The client periodically uploads compressed real-time images to the server, so that the server scores them based on a score regression model, and then returns the scores to the client to be displayed on a screen of the client for user's reference.

c) The client reads information from the built-in gyroscope. When a user stops moving, it is determined that adjustment is completed and autofocus will be performed.

d) After autofocus stops, photographing parameters are determined according to a parameter statistic model of the server, and the brightness of current focus area and the global area, and to automatically set a shutter and an aperture.

e) Finish photographing.

Figure 3:
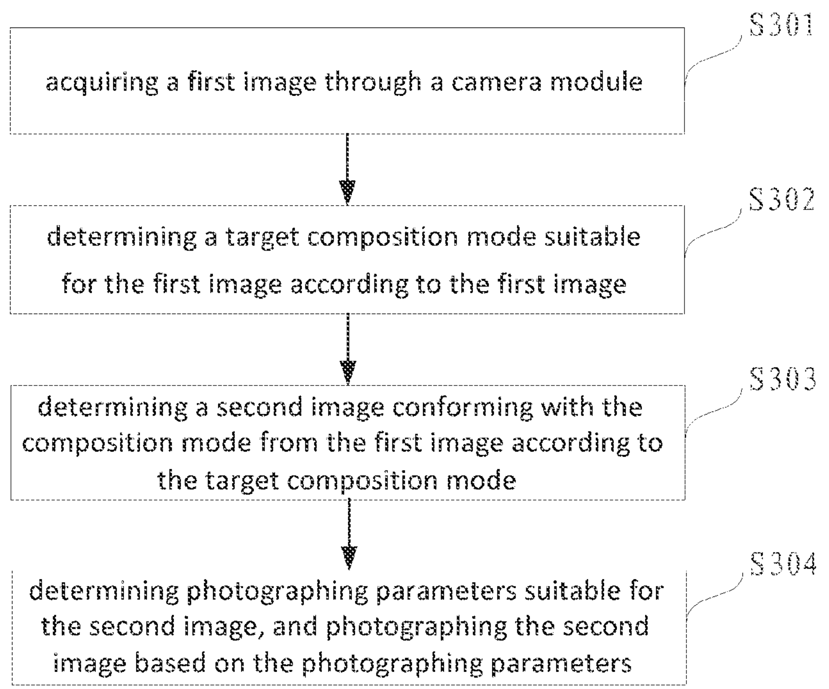
FIG. 3 is a processing flowchart of another photographing method provided by an embodiment of the present application.

FIG. 3 shows a photographing method provided by another embodiment of the present application. This method adopts the foregoing second way of acquiring a second image, and includes the following processing steps.

At step S301, a first image is acquired through a camera module.

At step S302, a composition mode suitable for the first image is determined according to the first image. When the composition mode is determined, the foregoing recognition model may be utilized to complete recognition at the user equipment or the server device, and to determine the composition mode suitable for the first image.

At step S303, the second image conforming with the composition mode is determined from the first image according to the composition mode. In this embodiment, the second image is not acquired through adjusting the camera module by the user, but is acquired through processing on the first image on the basis of the first image. When the second image conforming with the composition mode is determined from the first image, various image processing methods such as cropping and splicing the first image may be adopted. In this embodiment of the application, if the composition mode suitable for the first image is determined as a composition mode of nine square grids, a part of the image content on the left side of the first image does not conform with the composition mode. Therefore, when determining the second image, the first image may be cropped, i.e., the part of the image content on the left side may be removed, and thus a second image conforming with the composition mode is determined.

At step S304, photographing parameters suitable for the second image are determined, and the second image is photographed based on the photographing parameters. The detailed processing process of this step is similar to that in the foregoing embodiment, and details are not described herein again.

Based on the same inventive concept, in an embodiment of the present application, it is also provided a photographing device. The method adopted by the photographing device when taking a photograph is the photographing method in the foregoing embodiment, and the principle for solving the problem is similar to that of the method. The photographing device includes a memory for storing computer program instructions and a processor for executing computer program instructions, and the computer program instructions, when executed by the processor, trigger the device to perform the foregoing photographing method.

Figure 4:
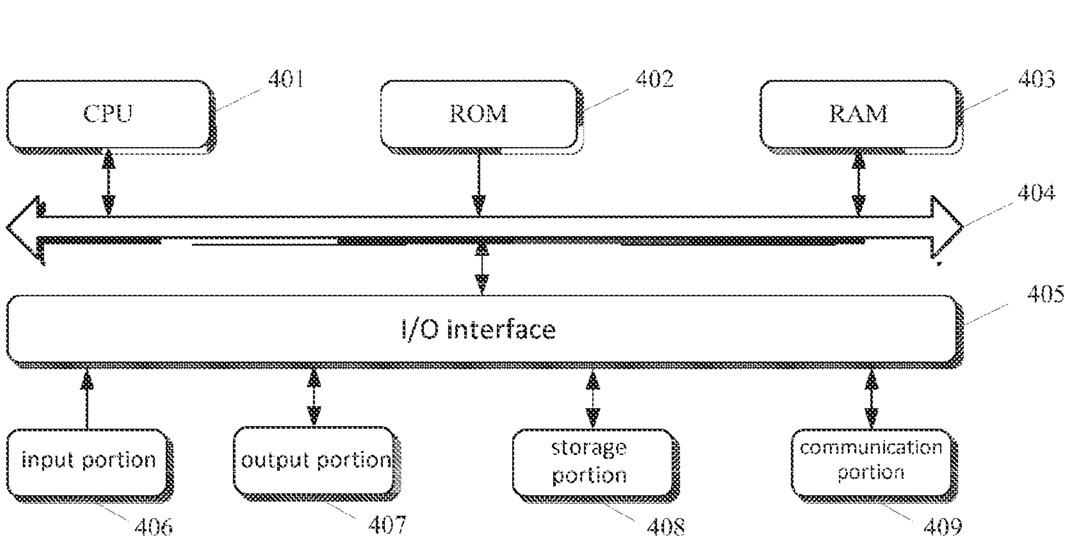
FIG. 4 is a schematic structural diagram of a photographing device provided by an embodiment of the application.

FIG. 4 shows a structure of a photographing device applicable to implement the method in the embodiments of the present application. The photographing device 400 includes a central processing unit (CPU) 401, which can perform various appropriate actions and processing according to the programs stored in a read-only memory (ROM) 602 or programs loaded from a storage portion 408 into a random access memory (RAM) 403. In the RAM 403, various programs and data necessary for the operation of the system are also stored. The CPU 401, ROM 402, and RAM 403 are connected to each other via a bus 404. An input/output (I/O) interface 405 is also connected to the bus 404.

The following components are connected to the I/O interface 405: an input portion 406 including camera modules, etc.; an output portion 407 including for example cathode ray tubes (CRT), liquid crystal displays (LCD), LED displays, OLED displays, etc. and speakers, etc.; a storage portion 408 including one or more computer-readable media such as hard disks, optical disks, magnetic disks, and semiconductor memories, etc.; and a communication portion 409 including a network interface card such as a LAN (Local Area Network) card, a modem, etc. The communication portion 409 performs communication processing via a network such as the Internet.

In one embodiment, the methods and/or embodiments in the embodiments of the present application may be implemented as computer software programs. For example, embodiments of the present disclosure include a computer program product including a computer program carried on a computer-readable medium, the computer program containing program code for performing a method shown in a flowchart. When the computer program is executed by the central processing unit (CPU) 401, the above functions defined in the method of the present application are performed.

It should be noted that the computer-readable medium described in the present application may be a computer-readable storage medium. The computer-readable medium may be, for example, but not limited to, an electronic, magnetic, optical, electromagnetic, infrared, or semiconductor system, apparatus, or device, or any combination thereof. More specific examples of the computer-readable storage medium may include, but are not limited to: electrical connections with one or more wires, portable computer magnetic disks, hard disks, random access memory (RAM), read-only memory (ROM), erasable Programming read-only memory (EPROM or flash memory), optical fiber, portable compact disk read-only memory (CD-ROM), optical storage device, magnetic storage device, or any suitable combination of the foregoing. In the present application, a computer-readable medium may be any tangible medium that contains or stores a program that can be used by or in combination with an instruction execution system, apparatus, or device.

Computer program codes for performing the operations of the present application may be written in one or more programming languages, or a combination thereof, including object oriented programming languages such as Java, Smalltalk, C++, and conventional procedural programming language, such as "C" or similar programming language. The program code can be executed entirely on the user's computer, partly on the user's computer, as an independent software package, partly on the user's computer and partly on a remote computer, or entirely on a remote computer or server. In the case of a remote computer, the remote computer can be connected to the user's computer through any kind of network, including a local area network (LAN) or wide area network (WAN), or it can be connected to an external computer (for example through Internet connection provided by an Internet service provider).

The flowcharts or block diagrams in the accompanying drawings show the architecture, functionality, and operation of possible implementations of devices, methods and computer program products according to various embodiments of the present application. In this regard, each block in the flowchart or block diagram may represent a module, a program segment, or a part of code, a portion of which contains one or more executable instructions for implementing a specified logical function. It should also be noted that in some implementations, the functions labeled in the blocks may also occur in a different order than those labeled in the drawings. For example, two successively represented blocks may actually be executed substantially in parallel, and they may sometimes be executed in a reverse order, depending on the functions involved. It should also be noted that each block in the block diagrams and/or flowcharts, and combinations of blocks in the block diagrams and/or flowcharts, can be implemented by a dedicated system for hardware that performs the specified function or operation, or they can be implemented with a combination of dedicated hardware and computer instructions.

Another embodiment of the present application further provides a computer-readable medium, which may be included in the device described in the foregoing embodiments, or may exist alone without being assembled into the device. The above computer-readable medium carries one or more computer-readable instructions, the computer-readable instruction being executable by a processor to implement the foregoing methods from various embodiments of the present application.

Summing up, the solution provided by some embodiments of the present application acquires a first image through a camera module and determines composition prompt information suitable for the first image; and then adds the composition prompt information in a display area of the first image, so that a user adjusts the camera module according to the composition prompt information; after the user completes the adjustment, acquires the second image through the camera module; and in turn determines photographing parameters suitable for the second image, and photographs the second image based on the photographing parameters. Thus, in various scenarios, suitable composition prompt information may be provided to the user according to the detailed content of the first image, and to prompt the user how to adjust. Meanwhile, after the user completes the adjustment, suitable photographing parameters are automatically determined for the user. Therefore, needs from users in a variety of photographing scenarios can be satisfied.

It should be noted that the present application can be implemented in software and/or a combination of software and hardware, for example, by using an application specific integrated circuit (ASIC), a general purpose computer, or any other similar hardware device. In some embodiment, the software program of the present application can be executed by a processor to implement the steps or functions described above. Likewise, the software programs (including related data structures) of the present application can be stored in a computer-readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

What is claimed is:

1. A photographing method, the method comprising:
- acquiring a first image through a camera module;
- determining composition prompt information suitable for the first image;
- adding the composition prompt information in a display area of the first image, so that a user adjusts the camera module according to the composition prompt information;
- acquiring real-time images through the camera module during the adjustment by the user, wherein the real-time images are a series of images including the first image and the second image changed from the first image;
- determining and displaying scores of the real-time images to the user so as to assist the user in completing the adjustment, wherein determining the scores of the real-time images comprises calculating the scores of the real-time images according to the real-time images and a score regression model, wherein the score regression model is generated by training sample images which have been labeled with scores;
- after the user completes the adjustment, acquiring the second image through the camera module;
- determining photographing parameters suitable for the second image; and
- photographing the second image based on the photographing parameters.

2. The method according to claim 1, wherein determining the composition prompt information suitable for the first image comprising:
- determining scenario information and the composition mode according to the first image; and
- determining the composition prompt information suitable for the first image according to the scenario information and the composition mode.

3. The method according to claim 2, wherein determining the scenario information and the composition mode according to the first image comprising:
- determining the scenario information and the composition mode according to the first image and a recognition model, wherein the recognition model is generated by training sample images which have been labeled with scenario information and composition modes; or
- transmitting the first image to a server device, and receiving the scenario information and the composition mode of the first image transmitted by the server device, wherein the server device determines the scenario information and the composition mode of the first image according to the first image and the recognition model, and wherein the recognition model is generated by training sample images which have been labeled with scenario information and composition modes.

4. The method according to claim 3, wherein transmitting the first image to the server device comprising:
- compressing the first image, and transmitting the compressed first image to the server device, so that the server device determines the scenario information and the composition mode of the first image according to the compressed first image and the recognition model.

5. The method according to claim 1, wherein determining the scores of the real-time images further comprising:
- transmitting the real-time images to a server device, and receiving the scores of the real-time images transmitted by the server device, wherein the server device calculates the scores of the real-time images according to the real-time images and the score regression model, and wherein the score regression model is generated by training sample images which have been labeled with scores.

6. The method according to claim 5, wherein transmitting the real-time images to the server device comprising:
- compressing the real-time images, and transmitting the compressed real-time images to the server device, so that the server device calculates the scores of the real-time images according to the compressed real-time images and the score regression model.

7. The method according to claim 1, wherein the method further comprising:
- determining a preset area to which the real-time image belongs based on positioning information acquired when the real-time image is acquired; and
- calculating the scores of the real-time images according to the real-time images and the score regression model, comprising:
- calculating the scores of the real-time images according to the real-time images and the score regression model corresponding to the preset area, wherein the score regression model is generated by training sample images which have been labeled with scores and are related to the preset area.

8. The method according to claim 1, wherein, after the user completes the adjustment, acquiring the second image through the camera module comprising:

determining whether the user has completed the adjustment; and if the adjustment has been completed, performing autofocus, and acquiring a focused second image through the camera module.

9. The method according to claim 8, wherein determining whether the user has completed the adjustment comprising:

obtaining gyroscope information, and determining whether the user has completed the adjustment according to the gyroscope information.

10. The method according to claim 1, wherein determining the photographing parameters suitable for the second image comprising:

recognizing a focus area for the second image;

determining brightness of the focus area and brightness of a global area of the second image; and determining the photographing parameters suitable for the second image according to the brightness of the focus area and the brightness of the global area of the second image.

11. The method according to claim 10, wherein determining the photographing parameters suitable for the second image according to the brightness of the focus area and the brightness of the global area of the second image comprising:

determining the photographing parameters suitable for the second image according to the brightness of the focus area and the brightness of the global area of the second image and a parameter statistical model, wherein the parameter statistical model is generated by training sample images which have been labeled with brightness of the focus area, brightness of the global area and photographing parameters; or transmitting the brightness of the focus area and the brightness of the global area of the second image to a server device, and receiving the photographing parameters suitable for the second image transmitted by the server device, wherein the server device determines the photographing parameters suitable for the second image based on the brightness of the focus area and the brightness of the global area of the second image and the parameter statistical model, wherein the parameter statistical model is generated by training sample images which have been labeled with brightness of the focus area, brightness of the global area, and photographing parameters.

12. The method according to claim 11, wherein before determining composition prompt information suitable for the first image currently acquired through the camera module according to the first image, the method further comprises:

obtaining positioning information; and determining whether the first image belongs to a preset area according to the positioning information, and if the first image belongs to the preset area, displaying recommended images belonging to the preset area to a user.

13. The method according to claim 12, wherein determining whether the first image belongs to the preset area according to the positioning information, and if the first image belongs to the preset area, displaying the recommended images belonging to the preset area to the user comprising:

transmitting location information to the server device, obtaining the recommended images belonging to the preset area from the server device, and displaying the recommended images to the user.

14. A photographing device, wherein the device comprising a memory for storing computer program instructions and a processor for executing computer program instructions, and wherein the computer program instructions, when executed by the processor, trigger the device to perform a method comprising:

acquiring a first image through a camera module;

determining composition prompt information suitable for the first image;

adding the composition prompt information in a display area of the first image, so that a user adjusts the camera module according to the composition prompt information;

acquiring real-time images through the camera module during the adjustment by the user, wherein the real-time images are a series of images including the first image and the second image changed from the first image;

determining and displaying scores of the real-time images to the user so as to assist the user in completing the adjustment, wherein determining the scores of the real-time images comprises calculating the scores of the real-time images according to the real-time images and a score regression model, wherein the score regression model is generated by training sample images which have been labeled with scores;

after the user completes the adjustment, acquiring the second image through the camera module;

determining photographing parameters suitable for the second image; and photographing the second image based on the photographing parameters.

15. A non-transitory computer-readable medium having computer program instructions stored thereon, the computer-readable instructions being executable by a processor to implement a method comprising:

acquiring a first image through a camera module;

determining composition prompt information suitable for the first image;

adding the composition prompt information in a display area of the first image, so that a user adjusts the camera module according to the composition prompt information;

acquiring real-time images through the camera module during the adjustment by the user, wherein the real-time images are a series of images including the first image and the second image changed from the first image;

determining and displaying scores of the real-time images to the user so as to assist the user in completing the adjustment, wherein determining the scores of the real-time images comprises calculating the scores of the real-time images according to the real-time images and a score regression model, wherein the score regression model is generated by training sample images which have been labeled with scores;

after the user completes the adjustment, acquiring the second image through the camera module;

determining photographing parameters suitable for the second image; and photographing the second image based on the photographing parameters.

* * * * *